US007251938B1

(12) United States Patent
Bond

(10) Patent No.: US 7,251,938 B1
(45) Date of Patent: Aug. 7, 2007

(54) SYSTEM AND METHOD FOR RECOVERING GEOTHERMAL ENERGY AND FOR CONVERTING RECOVERED GEOTHERMAL ENERGY INTO USEFUL POWER

(75) Inventor: Lesley O. Bond, Neosho, MO (US)

(73) Assignee: The Board of Regents for the University of Oklahoma, Norman, OK (US)

( * ) Notice: Subject to any disclaimer, the term of this patent is extended or adjusted under 35 U.S.C. 154(b) by 603 days.

(21) Appl. No.: 10/269,178

(22) Filed: Oct. 11, 2002

(51) Int. Cl.
    *F03G 7/00* (2006.01)
(52) U.S. Cl. .................................... 60/641.2
(58) Field of Classification Search ............... 60/641.2, 60/641.3, 641.4, 641.5
    See application file for complete search history.

(56) References Cited

U.S. PATENT DOCUMENTS

| | | | | |
|---|---|---|---|---|
| 3,755,076 A | * | 8/1973 | Lindsley | 376/273 |
| 3,786,858 A | | 1/1974 | Potter et al. | |
| 3,939,356 A | * | 2/1976 | Loane | 290/52 |
| 4,195,894 A | * | 4/1980 | Kotski | 439/101 |
| 5,058,386 A | * | 10/1991 | Senanayake | 60/692 |
| 5,535,591 A | * | 7/1996 | Priesemuth | 60/670 |
| 5,685,362 A | | 11/1997 | Brown | |
| 5,911,684 A | | 6/1999 | Shnell | |

OTHER PUBLICATIONS

D. V. Duchane, "Hot Dry Rock: A Versatile Alternative Energy Technology," Paper presented at SPE Annual Technical Conference & Exhitiion, Dallas, TX, USA, Oct. 22-25, 1995 (6 pages).
Los Alamos National Laboratory, operated by the University of California for the U.S. Dept. of Energy, "Hot Dry Rock Geothermal Enercy Technology," Internet website, posted prior to Oct. 11, 2002, the filing date of the above-referenced application (4 pages).

* cited by examiner

*Primary Examiner*—Hoang Nguyen
(74) *Attorney, Agent, or Firm*—Mary M. Lee

(57) ABSTRACT

Recovery and conversion of geothermal energy from geologically stable, hot, dry rock is disclosed. Deep boreholes are drilled to form a system of feed and return conduits in the non-porous formation. Fluid is passed through the conduits where heat energy is transferred to the moving fluid. The return conduit brings the hot fluid to an energy conversion station located underground where the thermal energy is converted into electrical energy. Power from the generator and warm water are supplied to the community for use. To form the deep boreholes, a series of large diameter boreholes is drilled, and the rig is moved down at intervals until the environment becomes intolerable. At that depth, a final borehole is drilled to reach the optimum temperature level. The system of this invention taps an unlimited source of energy in this country and accomplishes this in a manner that is both cost efficient and environmentally friendly.

40 Claims, 4 Drawing Sheets

SYSTEM AND METHOD FOR RECOVERING GEOTHERMAL ENERGY AND FOR CONVERTING RECOVERED GEOTHERMAL ENERGY INTO USEFUL POWER

FIELD OF THE INVENTION

The present invention relates generally to systems and methods for recovering geothermal energy found deep beneath the earth's surface and converting this thermal energy into usable power, and to methods for deep drilling to reach these reserves in stable subterranean formations.

BACKGROUND OF THE INVENTION

The potential for generating energy using the heat energy found within the earth, sometimes called "heat mining," has been the subject of much investigation over many years. If they can be tapped efficiently, our geothermal resources represent a practically inexhaustible source of non-fossil fuel.

Prior attempts to exploit geothermal energy have encountered various problems. Most of the problems could have been anticipated from the nature of the unstable rocks where the projects have been located. Some have attempted to recover geothermal energy from locations where unusually high temperatures are found relatively close to the surface. These geologically active areas typically are characterized by earthquakes, faulting, or igneous flows of molten material. It is these conditions which foretell an unsatisfactory outcome. Unstable geologic formations, where recent tectonic activity has taken place, normally are very fractured and highly mineralized with polluting formation fluids. Fractured formations release hydrogen sulfide and other undesirable gases, which should not be released into the atmosphere and which generate an unpleasant odor for miles around the site. Steam produced from water passing through these fractured formations may be highly mineralized and corrosive on turbines and generators.

In a conventional coal or gas fired electrical generator, the water is first heated to high pressure hot water, or steam at atmospheric pressure. A large portion of the energy from the coal or gas used to heat the water is lost as exhaust up the smoke stack. Water is heated to form thermal energy that is converted to mechanical energy, which drives a generator to form electrical energy. The big losses of energy occur when the cold water becomes high pressure steam. In conventional generator systems, more than half the energy is being wasted. Consequently, the maximum efficiency of traditional coal fired generators usually is less than 40 percent.

Thus, in spite of the efforts to date, there remains a need for a geothermal energy recovery and conversion system and method that is energy efficient, cost effective, and environmentally friendly. Coal is the most cost effective system of electrical generation in use today, but it produces a high degree of pollution. The emissions into the atmosphere, via the smokestack, are many including residual radioactive material carried in the coal. With present generating plants costing in the 750 million dollar range, the present invention provides a viable option for energy production.

SUMMARY OF THE INVENTION

The present invention is directed to system for recovering geothermal energy and converting it to useful power. The system comprises an energy conversion station installed in a cavity below the earth's surface. The energy conversion station has an inlet and an outlet. The system further comprises a heat exchange conduit system. The conduit system includes at least one feed conduit adapted to carry a heat exchange fluid from an entry level at or near the earth's surface down through a subterranean formation, so that the fluid absorbs heat energy from the formation. In addition to a feed conduit, the conduit system includes a return conduit adapted to carry the heated heat exchange fluid to the inlet of the energy conversion station. The energy conversion station is placed a sufficient distance below the earth's surface to create a pressure differential relative to the earth's surface, and a power supply conduit carries power from the conversion station to the surface.

In another aspect, the present invention comprises a system for recovering geothermal energy and converting it to useful power. In this embodiment, the system comprises an energy conversion station having an inlet, and a heat exchange conduit system. The conduit system includes at least one feed conduit adapted to carry a heat exchange fluid from an entry level at the earth's surface down through a deep, stable subterranean formation, so that the fluid absorbs heat energy from the formation. The conduit system also includes a return conduit adapted to carry the heated heat exchange fluid to the inlet of the energy conversion station. A power supply conduit is provided to carry power from the station to the surface.

In accordance with a method of the present invention, geothermal energy is recovered and converted to useful power. The method includes contacting heat exchange fluid from the earth's surface with a subterranean formation so that the heat exchange fluid absorbs heat energy from the formation. The heat energy in the heated exchange fluid is converted to power below the earth's surface. The conversion step is carried out a sufficient distance below the earth's surface to create a pressure differential relative to the earth's surface.

The present invention further includes a method for recovering geothermal energy and converting it to useful power, which comprises contacting heat exchange fluid from the earth's surface with a deep, stable subterranean formation so that the heat exchange fluid absorbs heat energy from the formation. Heat energy in the heat exchange fluid is then converted to useful power.

Further still, the present invention contemplates a method for making an underground borehole into a deep, stable subterranean formation. In accordance with this method, a distance is bored from a boring station on the surface toward a deep, stable subterranean formation. A portion of the borehole at the end of the distance is enlarged to form a subsurface workstation. Then, a distance is bored below from the subsurface workstation.

DETAILED DESCRIPTION OF THE PREFERRED EMBODIMENT

Our earth is a nearly spherical body with an equatorial radius of about 4,000 miles. If the Earth were reduced to a table top globe only 20 inches in diameter, the portion that man has physically explored through the deepest mines and boreholes would be a mere skin, only about 0.04 inch thick. However, through geophysical calculations, based on sound wave velocities and propagation theories, the geologic structure of the earth's interior has been modeled.

Figure 1:
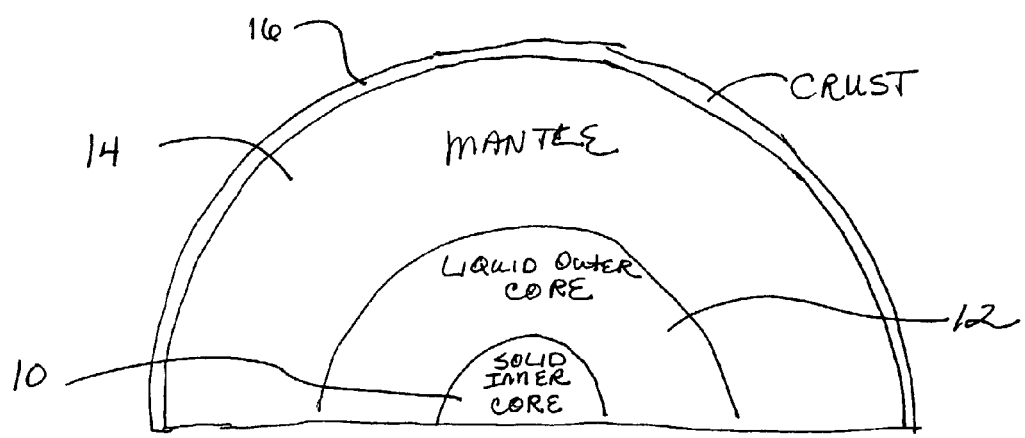
FIG. 1 is a diagrammatic illustration of the earth's structure from the surface to the core.

As illustrated in FIG. 1, the Earth has a solid inner ball or core 10 of nearly pure iron with a diameter of about 1500 miles and an unknown temperature. The propagation of sound waves indicates the center core is a solid at extreme pressures.

A fluid outer core 12 composed of a liquid iron alloy surrounds the core. The thickness of the fluid outer core is about 1300 miles. The temperature of the middle of the outer core must be greater than 9,600 degrees Fahrenheit for the iron to be molten at a pressure of 250 gigapascals. Surrounding the fluid outer core is a solid mantle 14 about 1800 miles thick. Over the mantle lies a relatively thin, chemically distinct crust 16. The crust varies in thickness from as thin as 4 miles in the deep ocean floor to an average of 40 miles near the center of the larger continents.

Figure 2:
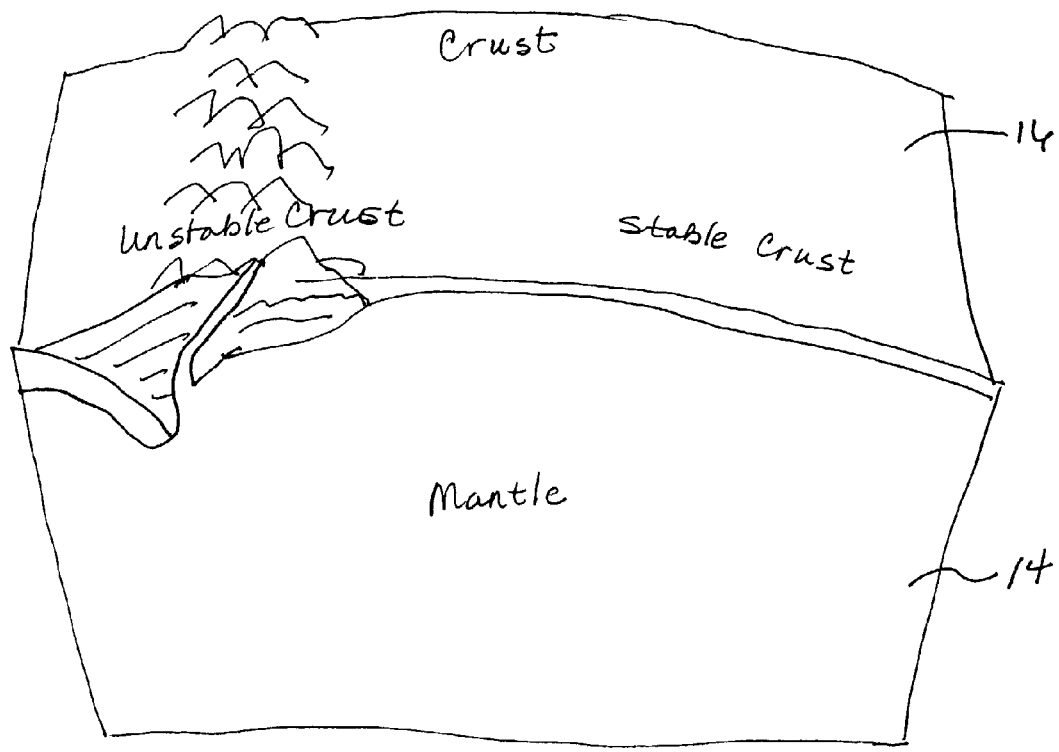
FIG. 2 is a diagrammatic illustration of a section of the earth's outer mantle and crust, viewed in perspective, illustrating a stable crust area and an unstable crust area.
Figure 3:
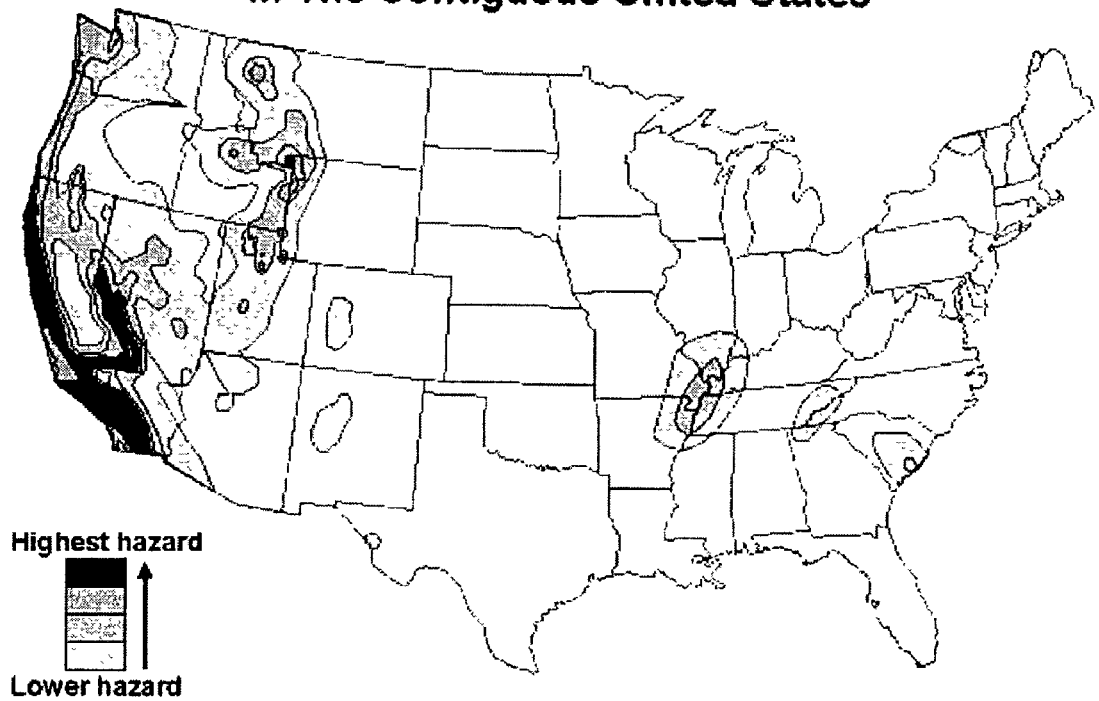
FIG. 3 is a map of the continental United States showing the unstable crust regions with dense stippling. The remaining expanses of unstippled territory represent relatively stable regions.

As represented in FIG. 2, the Earth's crust 16 has stable areas and unstable areas. The unstable areas generally surround active geologic features that are commonly associated with tectonics along the edges of shifting plates. It is in these unstable areas that volcanoes, earthquakes, geysers, hot springs, and other geological disruptions are found. Stable areas are those lacking significant geologic tectonic activity. The rock formations in stable areas are similar in nature to those in unstable areas. However, the formation distortion and heat distribution patterns are significantly different. FIG. 3 illustrates that the continental United States contains vast regions with stable crust.

The temperature of the subsurface formations deep in the Earth's stable crust regions have not been directly measured, except in a few super deep oil and gas wells. Consequently, the actual temperature gradients throughout these areas are not known. However, the temperatures in the stable regions have been extrapolated from the few direct readings available. Accordingly, it is expected that temperature in the stable formations increases at an average rate of 16 to 20 degrees Fahrenheit for each 1,000 feet of depth. Table 1, shown below, illustrates what the formation temperatures would be at selected depths based on the most likely heat gradients of 16, 18, and 20 degrees, respectively, for each 1000 feet, and an additional tabulation showing the temperature gradient starting at 16 degrees per 1,000 feet and the gradient increasing one degree per 10,000 feet.

TABLE 1

DEPTH vs. TEMPERATURE

| Depth from Surface (in feet) | 16° F./ 1000 ft. | 18° F./ 1000 ft. | 20° F./ 1000 ft. | 16(+1/10000) ° F./ 1000 ft. |
|---|---|---|---|---|
| Surface | 60 | 60 | 60 | 60 |
| 5,000 | 140 | 150 | 160 | 140 |
| 10,000 | 220 | 240 | 260 | 220 |
| 15,000 | 300 | 330 | 360 | 305 |
| 20,000 | 380 | 420 | 460 | 390 |
| 25,000 | 460 | 510 | 560 | 480 |
| 30,000 | 540 | 600 | 660 | 570 |
| 35,000 | 620 | 690 | 760 | 665 |
| 40,000 | 700 | 780 | 860 | 760 |
| 45,000 | 780 | 870 | 960 | 860 |
| 50,000 | 860 | 960 | 1060 | 960 |
| 55,000 | 940 | 1050 | 1160 | 1065 |
| 60,000 | 1020 | 1140 | 1260 | 1170 |
| 65,000 | 1100 | 1230 | 1360 | 1280 |
| 70,000 | 1180 | 1320 | 1460 | 1390 |
| 75,000 | 1260 | 1410 | 1560 | 1505 |

From the information in Table 1, it is apparent that virtually limitless amounts of heat energy are contained within stable regions of the Earth's crust. For example, a cubic yard of solid granite at about 50,000 feet deep would have an internal temperature of about 900 degrees Fahrenheit. Granite has a specific heat capacity of 0.26 BTU per pound per degree Fahrenheit at atmospheric pressure. Thus, a cubic yard of granite, weighing 4,470 pound, would give up 958,815 BTU's while cooling to 75 degrees Fahrenheit. This represents the energy in 7.0 gallons of mid-continent crude oil. Cooling a similar cubic yard of granite at 1,200 degrees Fahrenheit would equal the energy in 9.0 gallons of diesel fuel or 13 gallons of unleaded gasoline.

A barrel, or 42 gallons, of water weighs about 350 pounds. If this amount of water is heated to 750 degrees Fahrenheit and returned to a station near the surface and cooled to 100 degrees Fahrenheit, it would give off about 450,000 BTUs (British Thermal Units) as the fluid is cooled to 100 degrees Fahrenheit. This is equivalent to the energy value of 4.50 gallons of regular gasoline. Regular gasoline has a BTU content of about 100,000 BTUs per gallon. The exact value of the BTUs of energy would be dependent on the temperature and return pressure which affects the steam liquid/vapor quality and energy.

Harnessing the geothermal energy lying literally beneath our feet would reduce our dependency on fossil fuels and on foreign nations that produce them. The heat from only a few cubic miles of material in the Earth's interior would equal the energy capacity of all the oil and coal hydrocarbons in the world. The present invention provides a system and method for tapping this huge natural energy resource.

The present invention provides a system and method for using geothermal resources as fuel for producing electricity or other forms of energy. The system and method of this invention circulates clean, non-polluted surface water through a closed conduit system bored into a deep, stable formation. Because the formation is geologically stable and uncontaminated, toxic gases and corrosive minerals are not present. Moreover, because the granite is relatively non-porous, there is less need to case the borehole, and losses of circulating fluid into the subterranean formation are minimized.

Still further, the present invention eliminates the costly step of heating the fluid in order to produce steam, as is required in conventional systems. Instead, the heat exchange fluid arrives at the generating station as a very hot, high pressure fluid ready to be used in the conversion of heat energy to mechanical energy and ultimately to useful electrical energy.

The present invention includes a staged deep drilling process for making the conduit in the deep, stable subterranean formation. These and other advantages of the present invention will be apparent from the following description.

Figure 4:
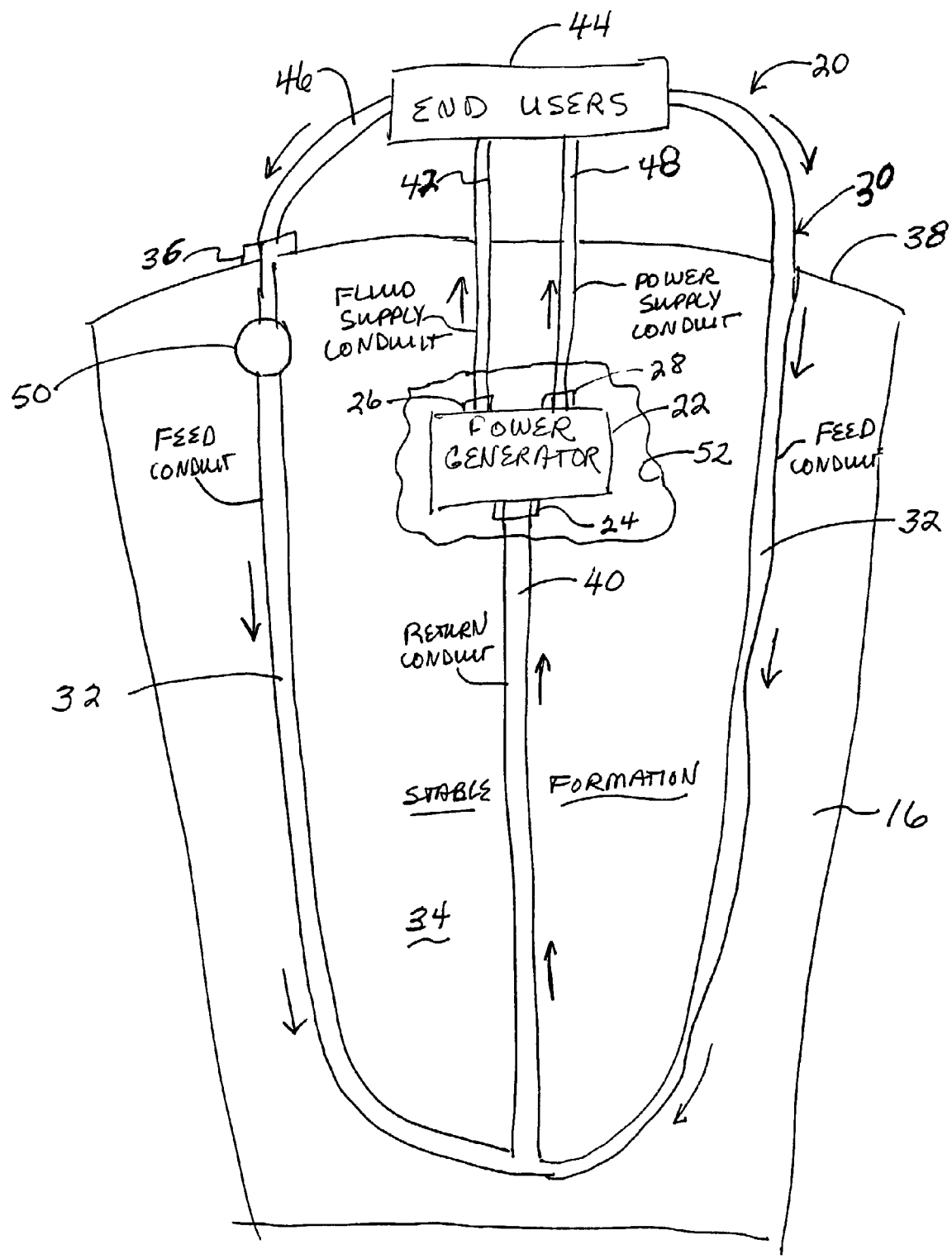
FIG. 4 is a diagrammatic illustration of a geothermal energy recovery system constructed in accordance with the present invention.

With reference now to the drawings in general and to FIG. 4 in particular, there is shown therein a system for recovering geothermal energy constructed in accordance with the present invention and designated generally by the reference numeral 20. The system 20 comprises an energy conversion station 22. In a preferred embodiment, the energy conversion station comprises a steam driven turbine for converting high pressure, high temperature liquid into steam to produce mechanical energy, and an electrical power generator coupled to the turbine to convert the mechanical energy to electricity. However, other methods and devices for converting the heat energy in the hot, high pressure heat exchange fluid into power could be employed. For example, in some experimental energy systems, the heat energy in the fluid is converted directly to electrical energy at very high temperatures. These and other energy conversion systems are considered within the scope of the present invention.

In some systems it may be desirable to divert some of the steam generated by the energy conversion system to operate other components of the system. For example, some of the steam could be used to drive pumps for lifting the hot water from the generator to the surface for use by the community.

The generator of the station 22 preferably has an inlet 24 for receiving the hot, pressurized heat exchange fluid and directing it to the turbine. In addition, the station 22 preferably includes a fluid outlet 26 and a power outlet 28.

The system 20 further comprises a heat exchange conduit system 30. The conduit system preferably includes at least one feed conduit 32. In most instances, the conduit system will include a plurality of feed conduits. In the system 20 illustrated in FIG. 4, there are two feed conduits, both identified by the reference numeral 32, but four or more feed conduits would be ideal. Each of the feed conduits 32 is adapted to carry a heat exchange fluid.

As used herein, "heat exchange fluid" can be any fluid, liquid or gas, capable of being circulated through the conduit system 30. In addition, the heat exchange fluid must be capable of absorbing heat energy from the surrounding formation 34 in which the conduit system is placed, transporting the absorbed heat energy to another location in the conduit system and releasing the heat energy at a selected point in the system. In most instances, the heat exchange fluid will be water, and preferably will be clean ground water, such as from a lake, stream or other nearby source, whether naturally occurring or man-made.

As indicated herein, the stable formation into which the conduit system is placed is relatively inert. That is, the solid granite material will not release a significant amount of minerals into the circulating water. Thus, the steam will not be corrosive on the turbine and generator assembly, and the hot ground water from the generator will be suitable for use by the community serviced by the system 20.

The feed conduits 32 are adapted to carry the heat exchange fluid from an entry point 36 at or near the earth's surface 38 down through the subterranean formation 34 so that the fluid is heated. The liquid should be hot enough so that when the fluid reaches the energy conversions station it will still be at least 400 degrees Fahrenheit, and preferably at least 500 degrees Fahrenheit. The nonporous nature of the formation will prevent expansion and vaporization of the heated fluid, which will greatly increase in pressure, thus providing "flash-ready" heated fluid for use by the turbine.

Consequently, the depth in the formation 34 to which the feed conduits 32 extend will depend on the temperature gradient. It will be most effective if the bottom hole temperature is higher than the desired operating level to accelerate heat transfer. The amount of heat energy transferred is a function of the time the fluid is exposed to the formation, the temperature difference between the heat exchange fluid and the formation, and the surface area of contact between the fluid and the formation. Preferably, the temperature of the formation is about 700 degrees Fahrenheit in order to produce heat exchange fluid that will be at least 500 degrees Fahrenheit when it reaches the energy conversion station.

Preferably, the subterranean formation 34 is a deep and stable formation. "Stable" when used to describe a subterranean formation denotes a formation that is geologically benign and solid, and lacking significant geologic tectonic activity. "Deep" when used to describe a subterranean formation denotes a depth below the surface sufficient to heat the heat exchange fluid to the desired temperature.

Referring still to FIG. 4, the heat exchange conduit system 30 preferably further comprises a return conduit 40. The return conduit 40 is adapted to carry the hot, pressurized heat exchange fluid from the feed conduit 32 to the inlet 24 of the generator 22. In one preferred arrangement, four feed conduits 32 would be placed around a single, central return conduit 40, the feed conduits placed equal distances apart and about 2.5 miles from the return conduit.

The heat exchange conduit system 30 may also include at least one fluid supply conduit 42 adapted to carry condensed heat exchange fluid from the fluid outlet 26 of the generator at the station 22. The fluid supply conduit 42 typically will supply heated water to a nearby community or facility, or to other end users, represented as "End Users" 44 in FIG. 4. In this arrangement, the conduit system 20 will include a reentry conduit 46 to collect spent heat exchange fluid from the under users 44 and direct the spent fluid back into the feed conduit 32 to be recycled.

The geothermal recovery system 20 will also include at least one power supply conduit 48 adapted to carry power generated by the generator 22 from the power outlet 28 to the end users 44. The power supply conduit 48 may take the form of electrical conduits where the energy being generated is electrical.

The heat exchange conduits 32, 40, and 42 may take various physical forms. However, in the preferred embodiment, the conduit is a borehole drilled through the formation 34. As explained herein, the stable, non-porous nature of the formation renders it relatively inert to the circulating heat exchange fluid. Accordingly, in most instances, the conduit system 30 will comprise at least partially uncased boreholes in the formation. However, the term "conduit" as used herein is not so limited and may also include lined boreholes or a subsurface tubing system of any sort.

With continuing reference to the schematic drawing of FIG. 4, it will be appreciated that some force will be required to push the heat exchange fluid through the heat exchange conduit system 30. One or more circulating pumps 50 may be employed for this purpose.

In the preferred practice of this invention, the energy conversion station 22 is installed in a cavity 52 below the earth's surface 38. More preferably, the station 22 is placed a sufficient distance below the earth's surface 38 to create a pressure differential relative to the feed conduit 32 near the entry point 36 at the surface. Most preferably, the station 22 is placed far enough below the surface so that hydrostatic pressure in the feed conduit is sufficient to circulate the fluid through the system and return the fluid to the subsurface generating station at a high pressure to supply quality steam for efficient use.

For example, placing the station 22 at about 2,500 feet beneath the surface 38 would make a pressure difference of about 1000 pounds per square inch (psi). This pressure could be changed with surface pumping to increase the steam quality of the return liquid.

Locating the conversion station below the surface makes possible higher return pressures where the return fluids would contain more desirable and better usable energy. In addition, higher fluid pressures and temperatures are more desirable in turbine and conventional electrical generating equipment as it raises the efficiency of the systems.

Creating a natural pressure differential is not the only advantage derived from the subsurface placement of the power generator 22. An underground generator plant is protected from damage from the environment, such as weather, vandalism or terrorist attack. Moreover, the formation 34 surrounding the generator 22 muffles the noises associated with the turbines and provides a virtually silent system for the community it serves. Still further, the underground generator is visually concealed and will not disfigure the otherwise visually appealing landscape.

Having described the features of the geothermal energy recovery system 20, a method for recovering geothermal energy now will be explained. In accordance with the method of the present invention, unheated heat exchange fluid is passed from the earth's surface through a heat exchange conduit in a subterranean formation so that the heat exchange fluid is contacted with the hot, dry rock in the surrounding formation. As a result of the contact, the fluid absorbs heat energy from the formation sufficient to vaporize the liquid into steam at atmospheric pressure but remains a high pressure liquid in the closed conduit system.

Preferably, the subterranean formation is a deep, stable formation. While the depth may vary, in a preferred embodiment of this method, the depth is at least 40,000 feet. The heat exchange conduit system may include one feed conduit and one return conduit, but usually will include a plurality of feed conduits all continuous with the return conduit, as described previously herein.

The hot pressurized heat exchange fluid then converted to useful power. In the preferred practice of this method, the hot, pressurized fluid is directed to an energy conversion station, such as a steam-driven turbine linked to a generator. Preferably, the energy conversion station is installed in a cavity below the earth's surface a sufficient distance to create a pressure differential relative to the surface.

Figure 5:
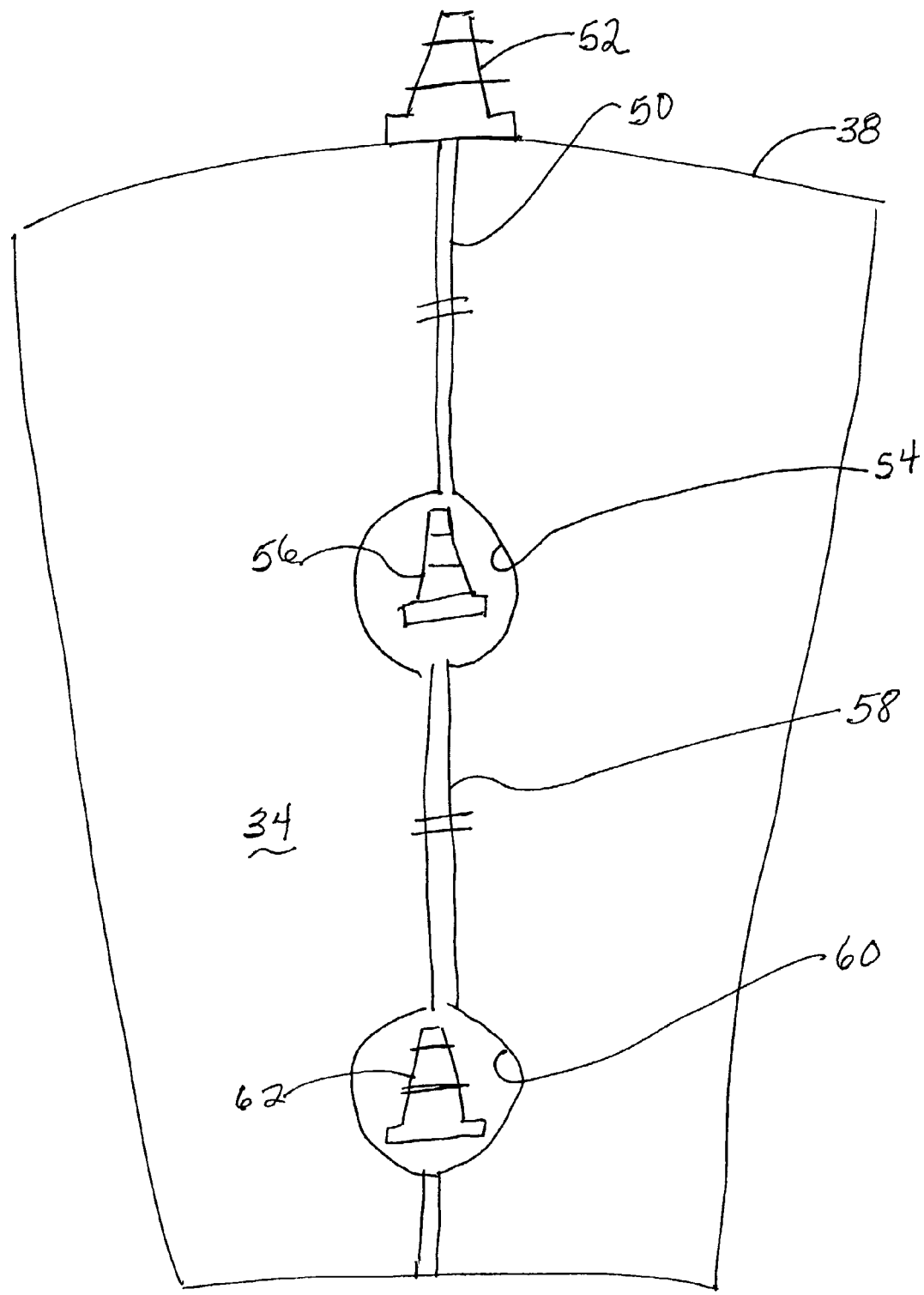
FIG. 5 is a diagrammatic illustration of the deep drilling method of the present invention that may be used to form the heat exchange conduit system utilized in the system of FIG. 4.

As explained herein, the present invention contemplates a conduit system comprising boreholes made deep into a stable geologic formation. Included in this invention is a method for making such a borehole. This method is illustrated schematically in FIG. 5, to which attention now is directed.

In accordance with this method, a large diameter hole 50 is bored a distance down into the earth from a boring station 52 such as a drilling rig at the surface 38. The hole is directed toward a selected deep, stable subterranean formation 34, as previously described. The diameter of the hole may vary, but preferably will be about 10-12 feet. The borehole would be used to transport personnel and equipment. Flow lines for fluid movement and cooling and ventilation conduits would also traverse the borehole.

After a selected distance, such as 3000-4000 feet for example, drilling is stopped and the hole is cased. Next, the bottom of the hole is excavated manually to form an enlarged subsurface workstation 54. After the workstation 54 is completed, the drilling rig 56 is disassembled, lowered into the workstation and reassembled. Then, using the reassembled rig 56, another section 58 of borehole is made. At the bottom of the second section 58, another subsurface workstation 60 is excavated, and the drilling rig is again disassembled, lowered into the workstation and reassembled into the rig 62. These steps are repeated until a selected depth in the formation 34 is reached or until the temperature in the formation becomes intolerable. Additional boreholes are drilled to form injection wells, or feed conduits, and at least one production well or return conduit. In this way, a useable depth is achieved. In most instances, a depth greater than 40,000 feet is preferred. With known directional drilling techniques, the ends of the boreholes are joined to form a continuous closed loop heat exchange conduit.

By way of illustration, but not limitation, an exemplary energy recovery and conversion system will be described. An exemplary system would include drilling the feed conduits to a depth of about 50,000 feet, which would have a temperature of about 1000 degrees Fahrenheit.

The heat exchange conduit system would comprise four feed conduits and one return conduit, and all the conduits would be about 15 inches in diameter. The four feed conduits would be arranged in a circle around the central return conduit. The circle of feed conduits would be about 5 miles in diameter, and the conduits would be located equal distances apart around the circle.

Fresh water would be used as the heat exchange fluid. The cold water would be injected and driven at about 7,920 feet per hour, or at about 1.5 miles per hour. The fluid would return through the central return conduit and reach the steam turbine and generator at about 750 degrees Fahrenheit.

At this flow rate, volume and bottom hole temperature, approximately 6,925 barrels (42 gallons per barrel) per hour of heated water would be produced. One barrel of 750 degree heated water cooling to 100 degrees produces 450,000 BTU's of energy, the equivalent of 4.50 gallons of regular gasoline. Therefore, 6,925 barrels of this hot, pressurized water would generate the same amount of energy as about 31,000 gallons of gasoline per hour. That is equivalent to approximately 95 truck-tanker loads of gasoline per 24 hour day.

One kilowatt hour equals 3,414 BTUs, so each barrel of fluid arriving at the surface would equal 131.810 Kilowatt hours (450,000÷3,414=131.810). At 6,925 barrels per hour, 912,785 BTUs of energy would be returned. At an efficiency of thirty-five percent (35%), the system could generate (912,785×24×0.35) 7,667,399 Kilowatt hours of electricity per 24 hour day. Additional surface cooling and heating could be carried out with the exhaust heat from the system.

At the present costs of coal and natural gas, steam can be generated at about $10 per thousand pounds with natural gas and $3.50 per thousand pounds with coal. The geothermal system of the present invention is capable of return 6.925 barrels of steam to equal $24,230 of natural gas steam energy or $8,480 of coal steam energy per hour with no fuel bills to pay. On a 24 hour basis, the fuel saving would be more than $500,000 with natural gas and about a third of that with coal.

An average household in the United States uses 101 million BTUs of energy a year (1997). It would take about 225 barrels of fluid to supply this typical household for a year. At this rate, the 6,925 barrel/hour output system of this invention could supply energy for nearly 740 homes per day or about 270,000 homes for a year. This would be a community about the size of Tulsa, Okla. or Kansas City, Mo. Even at fifty percent (50%) efficiency, nearly 135,000 homes (about 400,000 people) would be supplied with electricity.

Changes can be made in the combination and arrangement of the various parts and elements described herein without departing from the spirit and scope of the invention as defined in the following claims.

What is claimed is:

1. A system for recovering geothermal energy and converting it to useful power, the system comprising:
    an energy conversion station installed in an enclosed cavity below the earth's surface, the station adapted to convert thermal energy to useful power and having an inlet and an outlet;
    a closed heat exchange conduit system comprising:
        at least one feed conduit adapted to carry a heat exchange fluid from an entry level at or near the earth's surface down through a subterranean formation, so that the fluid absorbs heat energy from the formation; and
        a return conduit adapted to carry the heated heat exchange fluid to the inlet of the energy conversion station; and
    wherein the energy conversion station is placed below the earth's surface a distance selected to create hydrostatic pressure sufficient to circulate heat exchange fluid from the surface down the at least one feed conduit through the subterranean formation and up the return conduit to the energy conversion station; and
        a power supply conduit adapted to carry power generated by the energy conversion station to the surface.

2. The system of claim 1 wherein the subterranean formation is a deep, stable formation.

3. The system of claim 2 wherein the heat exchange conduit system comprises at least partially an uncased borehole.

4. The system of claim 3 wherein the at least one feed conduit comprises a plurality of feed conduits all continuous with the return conduit.

5. The system of claim 4 wherein the subterranean formation is at least 40,000 feet beneath the earth's surface.

6. The system of claim 1 wherein the heat exchange conduit comprises at least partially an uncased borehole.

7. The system of claim 6 wherein the subterranean formation is a deep, stable formation.

8. The system of claim 1 wherein the at least one feed conduit comprises a plurality of feed conduits all continuous with the return conduit.

9. The system of claim 8 wherein the subterranean formation is a deep, stable formation.

10. The system of claim 1 wherein the energy conversion station comprises a steam-driven turbine and electrical generator.

11. The system of claim 1 further comprising a fluid supply conduit adapted to carry heat exchange fluid from the energy conversion station back to the earth's surface.

12. A system for recovering geothermal energy and converting it to useful power, the system comprising:
    an energy conversion station adapted to convert thermal energy into useful power and having an inlet; and
    a closed heat exchange conduit system comprising:
        at least one feed conduit adapted to carry a heat exchange fluid from an entry level at the earth's surface down through a deep, stable subterranean formation, so that the fluid absorbs heat energy from the formation; and
        a return conduit adapted to carry the heated heat exchange fluid to the inlet of the energy conversion station; and
    a power supply conduit adapted to carry power generated by the energy conversion station from the generator to the surface.

13. The system of claim 12 wherein the heat exchange conduit comprises at least partially an uncased borehole.

14. The system of claim 13 wherein the subterranean formation is at least 40,000 feet beneath the earth's surface.

15. The system of claim 12 wherein the at least one feed conduit comprises a plurality of feed conduits all continuous with the return conduit.

16. The system of claim 15 wherein the heat exchange conduit comprises at least partially an uncased borehole.

17. The system of claim 12 wherein the subterranean formation is at least 40,000 feet beneath the earth's surface.

18. The system of claim 17 wherein the at least one feed conduit comprises a plurality of feed conduits all continuous with the return conduit.

19. The system of claim 17 wherein the heat exchange conduit comprises at least partially an uncased borehole.

20. The system of claim 12 wherein the energy conversion station comprises a steam-driven turbine and an electrical generator.

21. The system of claim 12 further comprising a fluid supply conduit adapted to carry heat exchange fluid from the energy conversion station back to the earth's surface.

22. A method for recovering geothermal energy and converting it to useful power, the method comprising:
    passing unheated heat exchange fluid from the earth's surface through a closed heat exchange conduit in a subterranean formation so that the heat exchange fluid absorbs heat energy from the formation; and
    converting the heat energy absorbed by the beat exchange fluid into useful power, the conversion being carried out in an enclosed cavity a distance below the earth's surface selected to create a hydrostatic pressure sufficient to circulate heat exchange fluid from the surface down the at least one feed conduit through the subterranean formation and up the return conduit to the energy conversion station.

23. The method of claim 22 wherein the subterranean formation is a deep, stable formation.

24. The method of claim 23 wherein the subterranean formation is at least 40,000 feet beneath the earth's surface.

25. The method of claim 22 wherein the energy conversion is carried out by an energy conversion station and wherein the heat exchange conduit comprises:
    at least one feed conduit adapted to carry a heat exchange fluid from an entry level at the earth's surface down through a deep, stable subterranean formation, so that the fluid absorbs heat energy from the formation; and
    a return conduit adapted to carry the heated heat exchange fluid to the energy conversion station.

26. The method of claim 25 wherein the at least one feed conduit comprises a plurality of feed conduits all continuous with the return conduit.

27. The method of claim 26 wherein the heat exchange conduit comprises at least partially an uncased borehole.

28. The method of claim 27 wherein the subterranean formation is a deep, stable formation.

29. The method of claim 28 wherein the subterranean formation is at least 40,000 feet beneath the earth's surface.

30. The method of claim 22 wherein the heat exchange conduit comprises at least partially an uncased borehole.

31. The method of claim 22 wherein the power into which the heat energy is converted is electricity.

32. A method for recovering geothermal energy and converting it to useful power, the method comprising:
   contacting heat exchange fluid in a closed conduit system with a deep, stable subterranean formation under heat exchange conditions so that the heat exchange fluid absorbs heat energy from the formation; and
   converting the heat energy absorbed by the heat exchange fluid into useful power.

33. The method of claim 32 wherein the contacting step is carried out using a heat exchange conduit comprising an at least partially uncased borehole.

34. The method of claim 33 wherein the heat exchange conduit comprises at least one feed conduit adapted to carry a heat exchange fluid from an entry level at the earth's surface down through a deep, stable subterranean formation, so that the fluid absorbs heat energy from the formation.

35. The method of claim 32 wherein the conversion step is carried out at an underground energy conversion station.

36. The method of claim 32 wherein the power into which the heat energy is converted is electricity.

37. The method of claim 32 wherein the subterranean formation is at least 40,000 feet beneath the earth's surface.

38. A method for making an underground borehole into a deep, stable subterranean formation, the method comprising:
   boring a distance from a boring station on the surface toward a deep, stable subterranean formation;
   enlarging a portion of the borehole at the end of the distance to form a subsurface workstation; and
   boring a distance below the subsurface workstation.

39. The method of claim 38 comprising repeating the steps of enlarging the borehole to form a subsurface workstation and boring a distance below the subsurface workstation until a selected depth in the deep, stable subterranean formation is reached.

40. The method of claim 39 wherein the selected depth is greater than 40,000 feet beneath the earth's surface.

* * * * *